United States Patent

Wynne et al.

[11] Patent Number: 5,985,071
[45] Date of Patent: Nov. 16, 1999

[54] REINFORCED LAMINATE WITH ELASTOMERIC TIE LAYER

[75] Inventors: Lyndell Kyle Wynne, Kingwood, Tex.; Abdeally Mohammed, Madras, India

[73] Assignee: Reef Industries, Inc., Houston, Tex.

[21] Appl. No.: 09/093,114

[22] Filed: Jun. 8, 1998

Related U.S. Application Data

[62] Division of application No. 08/668,965, Jun. 18, 1996, Pat. No. 5,773,373.
[51] Int. Cl.$^6$ .................................................. B32B 7/00
[52] U.S. Cl. ........................ 156/181; 156/230; 156/231; 156/166; 156/176; 264/171.1; 264/171.11; 264/173.11
[58] Field of Search ........................ 264/171.1, 171.11, 264/173.11; 156/230, 231, 166, 176, 181

[56] References Cited

U.S. PATENT DOCUMENTS

| | | |
|---|---|---|
| 2,851,389 | 9/1958 | Lappala . |
| 3,214,320 | 10/1965 | Lappala et al. . |
| 3,222,237 | 12/1965 | McKelvy . |
| 3,404,748 | 10/1968 | Bjorksten . |
| 3,523,856 | 8/1970 | Yaeger . |
| 3,616,130 | 10/1971 | Rogesch . |
| 3,644,165 | 2/1972 | Chen . |
| 3,791,911 | 2/1974 | Yaeger et al. . |
| 3,900,625 | 8/1975 | Chen . |
| 4,592,941 | 6/1986 | Emmons . |
| 5,328,743 | 7/1994 | Wynne et al. . |

OTHER PUBLICATIONS

T. C. Yu, G. J. Wagner, Exxon Chemical Company Polyolefin Modification with Exact™ Plastomers, Houston, Texas.

Exxon Chemical Company, Polymers Group Exact™ 4011 Plastomer for Film Blends.

Exxon Chemical Company, Exact™ 4044, Plastomer for Extrusion Coating and Cast Film Applications Oct. 1994.

Exxon Chemical Company, Exact™ Plastomers for Targeted Performance in Pololefin Modification Oct. 1993.

*Primary Examiner*—Rich Weisberger
*Attorney, Agent, or Firm*—Jenkens & Gilchrist, P.C.

[57] ABSTRACT

A method of making a reinforced laminate, including the steps of placing a reinforcing grid on a first outer sheet of thermoplastic, preparing an elastomeric material capable of forming a tie layer between two sheets of thermoplastic, and laminating a second outer sheet of thermoplastic to the first sheet of thermoplastic and the reinforcing grid with the tie layer of elastomeric material therebetween, whereby the reinforcing grid is held by the elastomeric tie layer in between the first outer sheet of thermoplastic and the second outer sheet of thermoplastic, and the reinforcing grid being displaceable within the elastomeric tie layer. A reinforced laminate, including a first outer layer of thermoplastic, a second outer layer of thermoplastic, a reinforcing grid disposed between the first outer layer and the second outer layer, a tie layer of elastomeric material disposed between the first outer layer and the second outer layer arranged to hold the reinforcing grid but allow slippage of the reinforcing grid in the tie layer upon tensile loading of the reinforced laminate, and wherein the first outer layer, the second outer layer, the reinforcing grid, and the tie layer are laminated together to form a reinforced laminate.

4 Claims, 5 Drawing Sheets

REINFORCED LAMINATE WITH ELASTOMERIC TIE LAYER

This is a divisional of U.S. application Ser. No. 08/668,965, filed Jun. 18, 1996, now U.S. Pat. No. 5,773,373.

BACKGROUND OF THE INVENTION

Thermoplastic sheets have provided effective and relatively light weight covers for a wide variety of uses including cargo and container covers, ground covers, and temporary building covers. The thermoplastic sheets are waterproof, and can include additives for ultraviolet protection from degradation in sunlight, flame retardants, and coloring pigments depending on the intended use.

Reinforced thermoplastic laminates have been made previously with a reinforcing grid between two sheets of thermoplastic to enhance the physical performance of the product. The reinforcing grid is typically a scrim of woven or nonwoven fabric. In some reinforced thermoplastic laminates, the thermoplastic sheets are bonded to each other in between the grid pattern of the reinforcing material. Thermoplastics with different melt characteristics for laminating the sheets around the grid also have been utilized. Although the heat sealing provides good bonding around the reinforcing grid, these reinforced thermoplastic laminates are nonetheless susceptible to tearing as shown in FIG. 6.

Another type of reinforced thermoplastic laminate includes a layer of flexible adhesive in between the thermoplastic sheets. The grid is disposed within the layer of flexible adhesive. The flexible adhesive allows the scrim to slip in between the thermoplastic sheets, thereby providing good tear resistance. The enhanced tear resistance of the laminate results from the tendency of the strands of the scrim to slide together without breaking within the laminate when a tear is pulled. However, laminates with adhesives, although having improved tear resistance, can delaminate as shown in FIG. 7. These laminates are particularly susceptible to outdoors delamination due to water or heat sensitivity. Therefore, reinforced thermoplastic laminates without adhesives have enhanced lamination strength, but diminished tear resistance, while those with adhesives have enhanced tear resistance, but diminished lamination strength.

SUMMARY OF THE INVENTION

A reinforced laminate and a method for making the laminate have been developed which include an elastomeric tie layer for the reinforcing grid between two sheets of thermoplastic. The reinforced laminate has a first and second outer thermoplastic sheet which may be a monolayer or a coextruded sheet of film. The coextruded skins on one or both outer sides of the thermoplastic sheets may be composed of a different polymer and additives than the inner body of the thermoplastic sheet.

A reinforcing grid is disposed between the first and second outer sheets of thermoplastic along with an elastomeric tie layer which holds the reinforcing grid between the layers of thermoplastic. The elastomeric tie layer has a lower modulus than the outer thermoplastic layers. The elastomeric tie layer allows for the slippage of the reinforcing grid when force is applied to the laminate while otherwise holding the reinforcing grid in between the thermoplastic layers. The elastomeric tie layer allows for slippage of the reinforcing grid when the laminate is pulled with sufficient strength to cause it to tear or deform.

The reinforcing grid may be a scrim of nonwoven material. The elastomeric tie layer may be any material that acts as a low modulus adhesive and allows for the reinforcing grid to slip and move between the outer thermoplastic layers.

The reinforced laminate can be made by placing the reinforcing grid on a first outer sheet of thermoplastic. The elastomeric material capable of forming a tie layer between two sheets of thermoplastic is then prepared. A second sheet of thermoplastic is then laminated to the first sheet of thermoplastic and reinforcing grid with the elastomeric tie layer in between. The lamination may include pressure rolling the sheets of thermoplastic with the tie layer and reinforcing grid therebetween.

A reinforced laminate of the present invention is flexible and pliable, heat sealable across the entire sheet provides for fiber slippage to increase tear resistance. The product exhibits good characteristics for outdoor usage and handling due to the laminate components.

DESCRIPTION OF THE PREFERRED EMBODIMENTS

Figure 2:
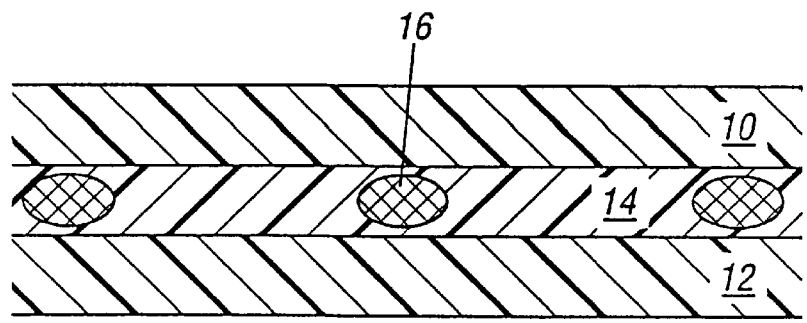
FIG. 2 is a cross-section of the reinforced laminate.

The reinforced laminate is made with two outer sheets or films of thermoplastic material. As shown in FIG. 2 the outer sheets 10 and 12 are pre-formed and can be made by either using a blown process or an extrusion process such as cast extrusion. The sheets 10 and 12 can be constructed from a wide range of materials including polyethylenes, polypropylenes, poly-vinyl-chloride, polyester, and any other polymers capable of being formed into sheets. The invention is not limited to any particular polymer for the outer sheets, except to those consistent with the description herein. Typically, a film made of linear low density polyethylene (LLDPE) is used. LLDPE has good toughness, heat sealability, tear resistance, and puncture resistance properties. The tie layer 14 is in between the sheets 10 and 12, with the grid section 16 disposed in the tie layer 14. The outer sheets can be mono-layers as shown in FIG. 2 or multiple layers (i.e., multi-ply construction) as shown in FIG. 3.

Figure 3:
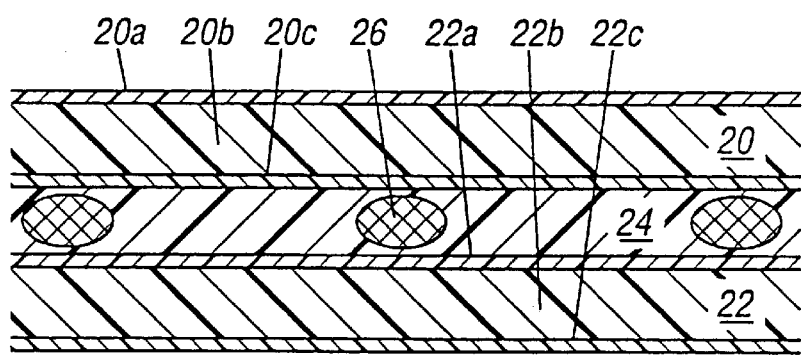
FIG. 3 is a cross-section of the reinforced laminate made with coextruded film.

Multi-ply outer sheets 20 and 22 are shown in FIG. 3 and are composed of three plys each 20a, 20b, and 20c and 22a, 22b, and 22c. The plys may be made of different materials to enhance the characteristics of the laminate. For example, a multi-layer film can include intermediate layers 20b and 22b made of LLDPE and high density polyethylene (HDPE) and outer layers 20a, 20c, 22a, and 22c made of LLDPE. High density polyethylene is used for greater chemical resistance and also to increase the modulus or stiffness of the outer layers. FIG. 3 also shows a tie layer 24 and a section of grid 26 in the tie layer. Although three ply sheets 20 and 22 are shown, the number of plies and the composition of each ply are not limited. The outer sheets can range in thickness from 1 mil to 6 mil, more typically in the range of 2 mil to 4 mil.

Figure 4:
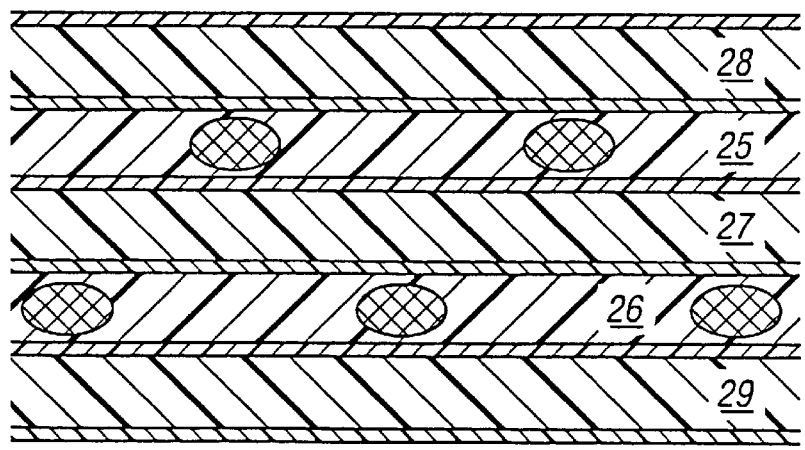
FIG. 4 is a cross-section of the reinforced laminate with multiple reinforcement layers and coextruded film.
Figure 5:
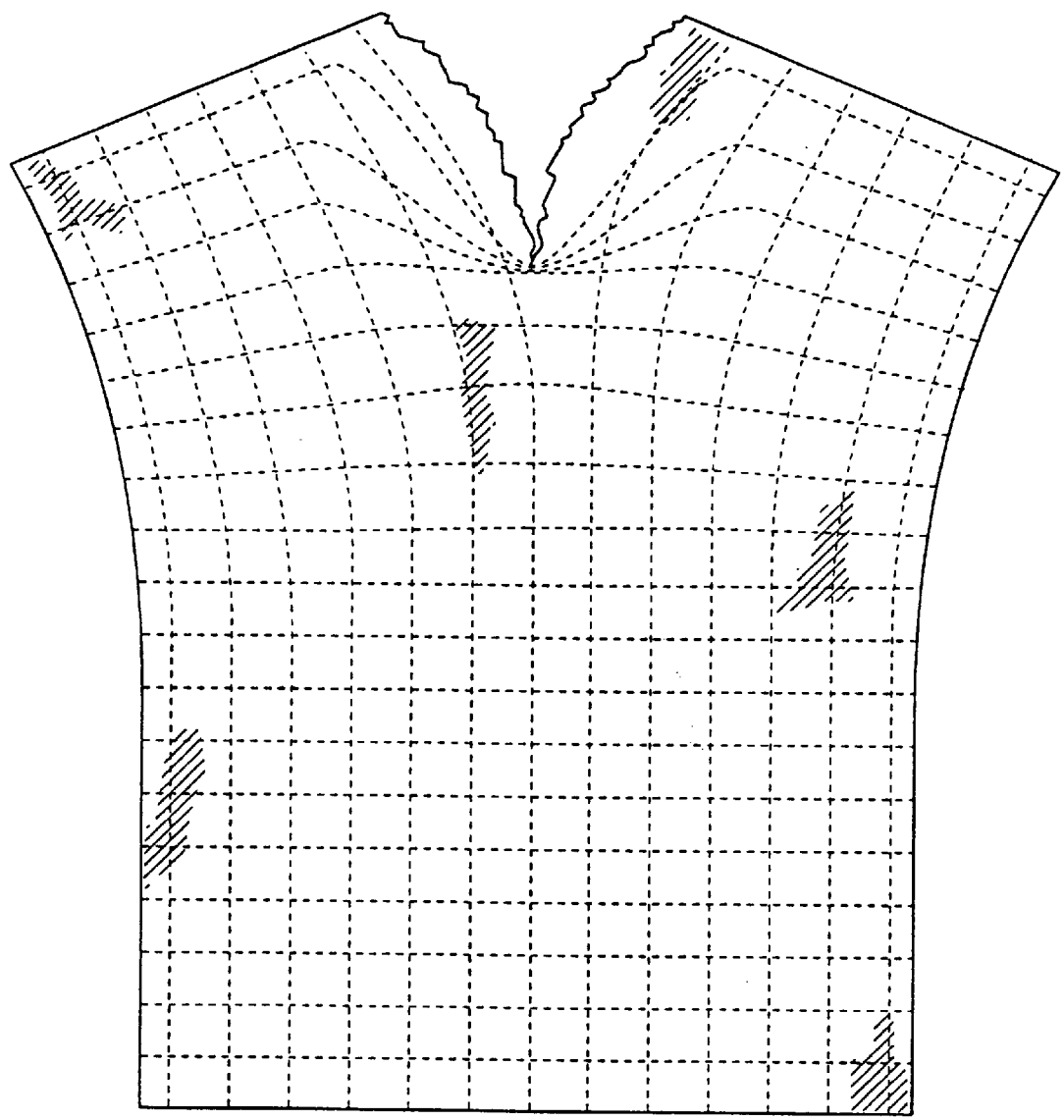
FIG. 5 is an illustration of the fiber slippage of the grid in the reinforced laminate.
Figure 6:
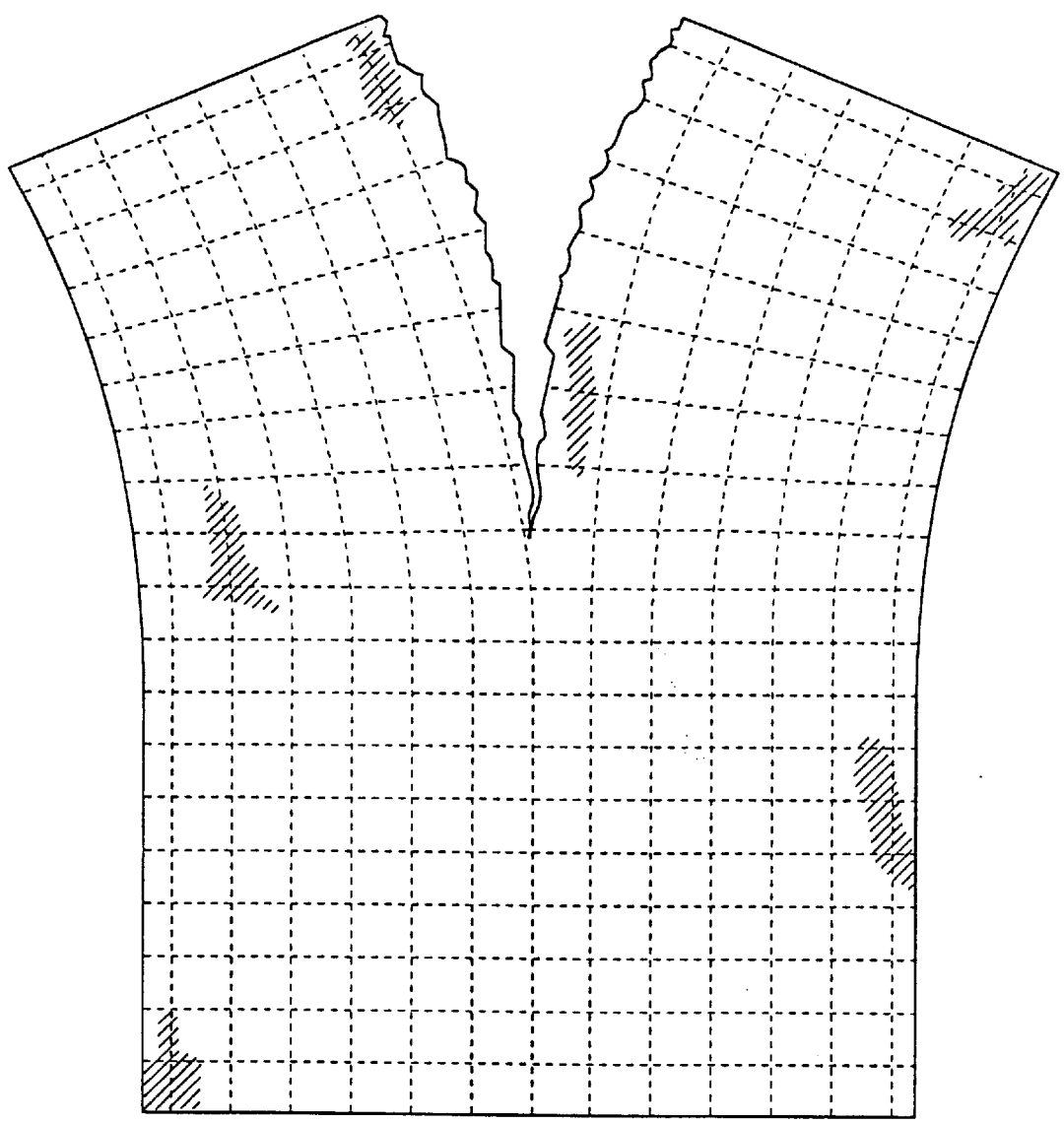
FIG. 6 is an illustration of a prior art film showing tear characteristics.
Figure 7:
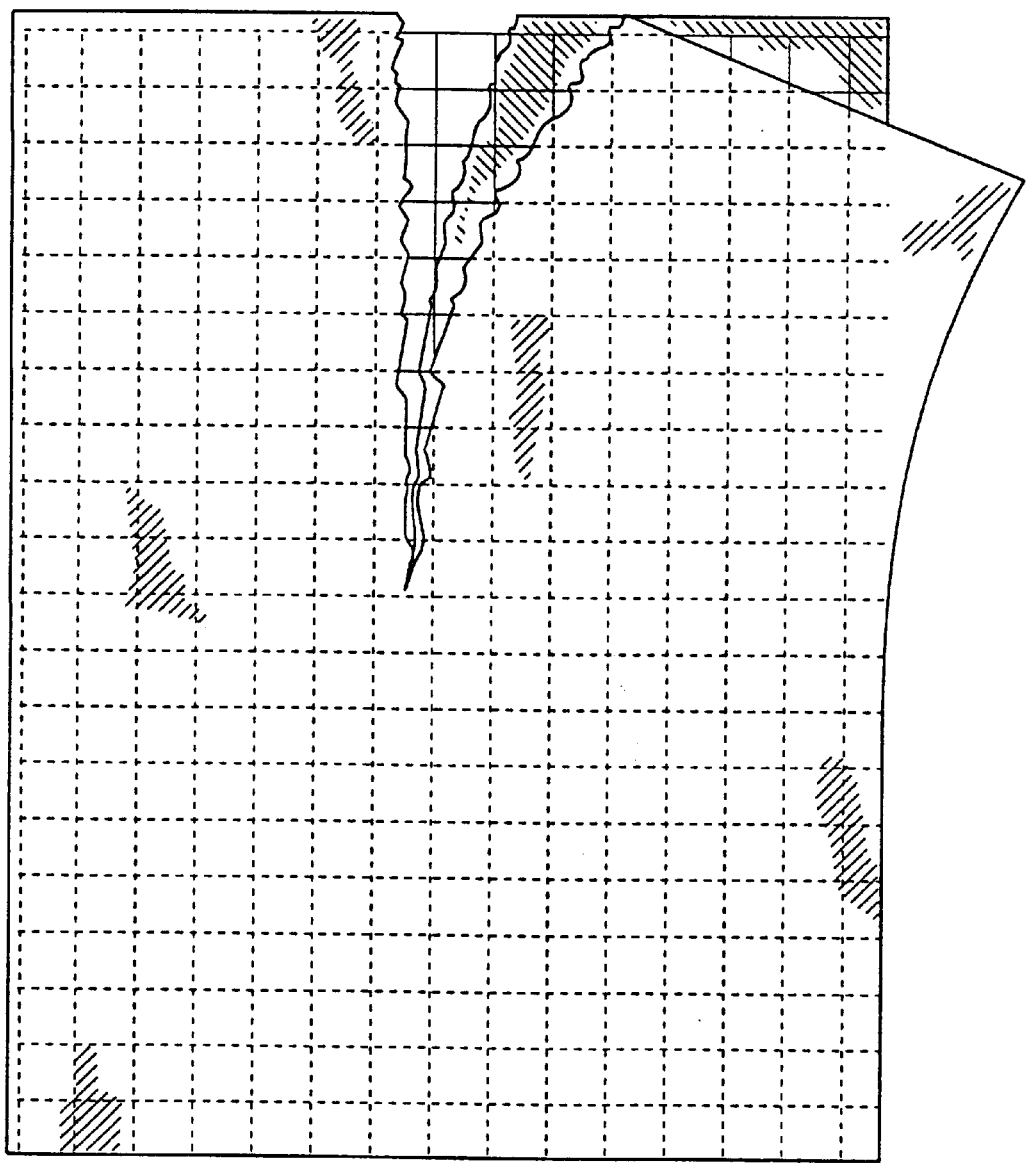
FIG. 7 is an illustration of a prior art film showing delamination.

FIG. 4 is an illustration of a cross-section of another embodiment of the invention utilizing two tie layers 25, 26 each with a reinforcing grid. A thermoplastic sheet 27 is between the tie layers 25, 26. Outer thermoplastic sheets 28, 29 are provided. The embodiment illustrated in FIG. 4 includes coextruded thermoplastic sheets 27, 28, and 29, however, monolayers or multi-ply thermoplastic sheets may be used. The reinforced laminate of this invention may contain multiple tie layers and polymer layers as desired for the intended purpose.

The outer sheet or ply can be stabilized for outdoor exposure by use of additives such as hindered amine light stabilizers (HALS), carbon black, or white titanium dioxide pigmentation. Other additives, as known to those skilled in the art, may be used depending on the intended use of the laminate including flame retardants, colorants and pigments, static reducers, biocides, ultraviolet absorbers/stabilizers, and antioxidants.

The reinforcing grid is a non-woven fiber grid. The grid is typically composed of main filaments running in the machine direction and orthogonal filaments running in the transverse direction. Different grid constructions can be obtained by using varying numbers of fibers in the machine and transverse direction. The filaments should be high strength, low shrinkage in heating, and able to withstand the temperature of plastic being poured, laminated, or extruded over it. Typically, filaments used for the construction of this grid are made from polyester, nylon, aramid, fiber glass and other commonly used filament materials. More typically, a grid made from either polyester, nylon, or fiber glass is used. In the case of polyester the type of filament used for the construction of the grid is a 500–1500 denier, high-tenacity, low shrinkage yarn. More typically, the yarn is a 840–1000 denier type such as 787 yarn from Hoechst Celanese, Salisbury, N.C. The grid or scrim 12 is manufactured by cross-laying the filaments over each other, securing them together by passing through a bath of a tackifier, commonly poly-vinyl alcohol, and then drying, rolling, and packaging on a core. This non-weaving process makes possible the construction of a reinforcement fabric with a low count of filament yarns. The grids commonly used for reinforcement of plastic sheets can vary from a 20×20 construction to a 1×1 construction (i.e., 20×20 meaning 20 filaments per inch in the machine direction and 20 filaments per inch in the transverse direction). More typically, the constructions used varies from a 5×5 to 1×1. Most typically, the constructions are a 3×2 and 2×1 construction.

The grid is held between the outer sheets by the tie layer. The grid can be embedded or surrounded by the tie layer. The tie layer is a material with a lower modulus than the outer sheets. Certain elastomeric materials with a relatively low modulus include butyl rubber, PVC, polyurethane, neoprene, and ethylene propylene diene (EDPM). These materials need to be dissolved in water or solvents for processing. In addition, ethylene methylacetate (EMA) and ethylene vinyl acetate (EVA) have a lower modulus than the polyethylenes and polypropylenes used for laminates. The EMA and EVA resins are heavy, tacky and not as tough as other alternatives for the tie layer, as well as being difficult to process.

A group of elastomeric materials suitable for use as the tie layer are polyolefin elastomers manufactured by the co-polymerization of ethylene or propylene with monomers, such as propylene, butene, hexene, octene, methyl acrylate, and vinyl acetate using either gas-phase or solution process technology. This comonomer prevents formation of crystallinity, and lowers density and modulus of the polymer. The crystallinity of the polymer determines the stiffness or flexibility of the polymer, the crystallites "tie together" the polymers chains restricting motion and making them stiff. In the absence of these crystallites the entangled mass of contorted chains will tend to "straighten out" or uncoil when deformed, and will tend to coil up again when the restraining force is removed, thereby displaying elastic or rubbery behavior. Typical polyolefin materials exist as partly crystalline solids at normal temperatures, with crystallinity in the range of 40–60%, whereas the crystallinity of a comonomer ranges from 1–6%.

Elastomeric polymers achieve and maximize the physical properties required for a flexible reinforced laminate such as flexibility, tear resistance, puncture resistance, and environmental performance. Referred to as plastomers (Exxon and Dow) or Catalloy resins (Himont), these polyolefin resins are soft and resilient, like elastomers, and are free flowing pellets that can be processed with traditional equipment like plastics. Polypropylene Catalloy resins are used when the outer skin layers are made from polypropylene. Polyethylene plastomer resins are used with polyethylene skin films. Table 1 is a comparison of the physical characteristics and film properties of LDPE, LLDPE, which is used as an outer sheet material, Exact 4044, EMA, and EVA. Exact 4044 is an ethylene-based hexene plastomer made by Exxon Chemical.

TABLE 1

|  |  | LDPE | LLDPE | Plastomer Exact 4044 | EMA | EVA |
|---|---|---|---|---|---|---|
| PHYSICAL CHARACTERISTIC | | | | | | |
| Density (g/cc) | | 0.92 | 0.92 | 0.895 | 0.94 | 0.939 |
| Melt Index (M.I.) | | 1.8 | 0.96 | 16.5 | 1.75 | 1.75 |
| Comonomer (%) | | 0 | 6 | 14 | 17 | 17 |
| Melting pt. (° C.) | | 110 | 124 | 89 | 85 | 88 |
| Crystallinity (%) | | 40–60 | 50–60 | 20–40 | 20–30 | 20–30 |
| FILM PROPERTY | | | | | | |
| 1% Secant | MD | 26900 | 37700 | 9430 | 6900 | 9200 |
| Modulus (psi) | TD | 28700 | 42600 | 8690 | 7400 | 9800 |
| Tensile strength (psi) | | 3760 | 6750 | 8090 | 3860 | 3780 |
| Elongation (%) | | 140 | 730 | 480 | 270 | 180 |
| Dart Drop (gm/mil) | | 64 | 268 | 1846 | 256 | 449 |
| Elmendorf tear | MD | 312 | 475 | 314 | 14.4 | 27.2 |
| (gm/mil) | TD | 144 | 599 | No fail | 224 | 224 |

MD — Machine Direction, TD — Transerse Direction

The co-polymerized elastomers are lower modulii, lower crystallinity, higher flexibility and melt processable resins achieved by the incorporation of high levels of comonomer in either a polyethylene (DOW and Exxon) or polypropylene (Himont, Fina, Shell) chain. Typically, a polyethylene elastomeric tie resin is used where outer sheets 10 and 12 are polyethylene based, and polypropylene elastomeric tie resin is preferred in case of polypropylene outer sheets 10 and 12. The polyethylene resins are substantially linear olefins within a narrow molecular weight distribution. The resins used in this invention can vary in density from 0.860 to 0.920 g/cc and in comonomer concentration from 20% to 6%. More typically, density ranges from 0.890 to 0.910, with a tensile modulus (1% secant—D882) in the range of 5000–15000 psi. Table 2 lists the physical characteristics and film properties of some polyethylene and polypropylene co-polymerized products that can be used in the tie layer.

outer skin sheets). Additives can be used in the tie layer to impart specific properties, including, but not limited to, UV stability, fire retardation, and infrared barriers.

The following are two examples of the reinforced laminate with elastomeric tie layer.

EXAMPLE 1

Two layers of 3 mil linear low density polyethylene (LDPE) films were used as the outer skin films. These are monolayer films produced by the blown film process and are UV stabilized using white pigment in combination with a UV stabilizer. The reinforcing grid or scrim was a 2×2 count scrim, constructed using 1000 denier, high tenacity, low shrinkage yarn. The binder used to keep the fibers together w as a standard polyvinyl alcohol finish. The elastomeric tie-layer, Exxon Exact 4044 has a melt index of 16.5 and a density of 0.895. The tie-layer was blended with about

TABLE 2

|  | ASTM |  | Exxon 4044 | Dow DPT1450 | Himont KS-057P |
|---|---|---|---|---|---|
| PHYSICAL CHARACTERISTICS |  |  |  |  |  |
| Density (g/cc) | D1505/D-792 |  | 0.895 | 0.902 | 0.90 |
| Melt Index (M.I.) | D-1238,E |  | 16.5 | 7.5 | — |
| Melt Flow (MFR) | D-1238 |  | — | — | 30 |
| Melting Point (° C.) |  |  | 89 | 98 | 141 |
| FILM PROPERTY |  |  |  |  |  |
| 1% Secant Modulus (psi) | D-882 | MD | 9430 | — | 6600 |
|  |  | TD | 8690 | — | 5200 |
| Tensile strength @ yield | D-882 | MD | 690 | 840 | 770 |
| (psi) |  | TD | 600 | 770 | 600 |
| Tensile strength @ break | D-882 | MD | 8090 | 5435 | 1790 |
| (psi) |  | TD | 6440 | 4300 | 1030 |
| Elongation @ break (%) | D-882 | MD | 480 | 620 | 610 |
|  |  | TD | 700 | — | 650 |

MD — Machine Direction, TD — Transverse Direction

Figure 1:
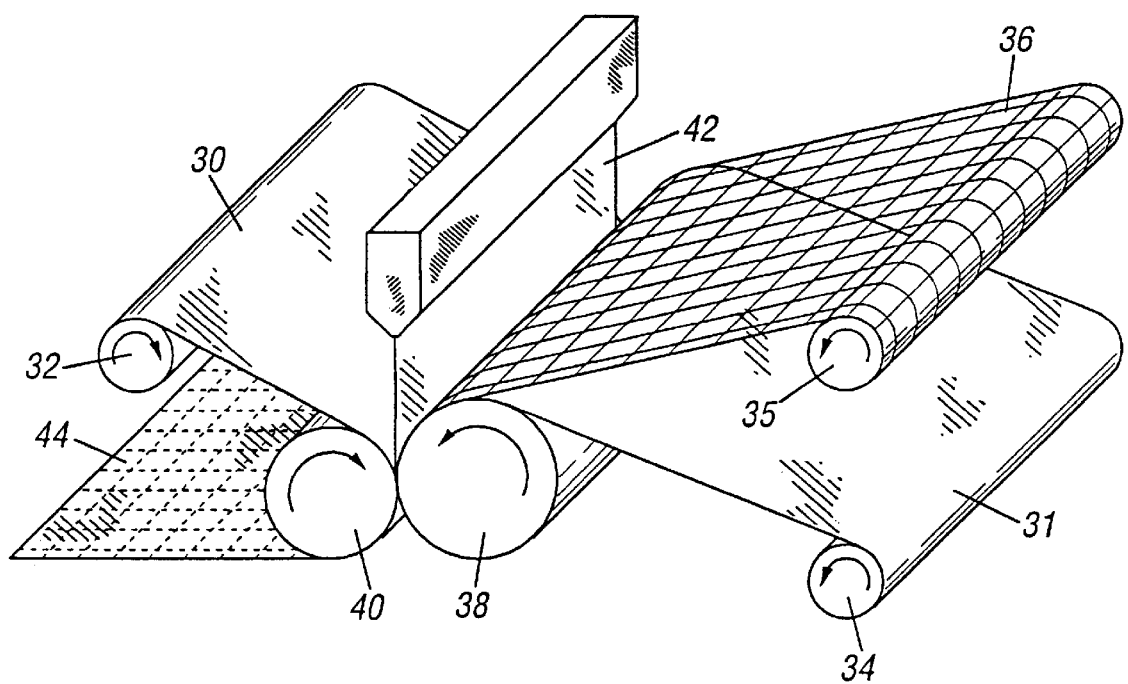
FIG. 1 is a schematic drawing of an exemplary method for making the reinforced laminate.

FIG. 1 is an example of an extrusion lamination setup. outer sheets 30 and 31 are and grid 36 are provided by rolls 32, 34, and 35, respectively. Grid 36 is the reinforcing grid or scrim that is placed in between the outer sheets 30 and 31 to provide tear reinforcement. Outer sheets 30 and 31 and the reinforcing grid 36 are passed through pressure roll 38 and cooling roll 40, at which point they interact with the hot sheet of the elastomeric tie layer 42. The layers are sufficiently pressured to allow adhesion of the outer skin layers around the tie layer and scrim, while avoiding excessive pressure that can lead to fusion and thinning of the layers. The outer sheets 30 and 31 are adhered together by the tie-layer 42, with the reinforcing grid 36 imbedded in the tie-layer to form the reinforced laminate 44.

The hot elastomeric resin 42 is poured out of a polymer die at a temperature of 530–630° F. More typically, the temperature ranges from 550–600° F. The elastomeric materials used as tie layers tend to be unstable when extruded due to their elastic nature. They are stabilized by adding about 0–10% of a stable resin. For example, typically a 7.0 melt index low density polyethylene (LDPE) (such as Chevron 1017) is added when a polyethylene comonomer is used. Typically, addition of about 5–6% LDPE resin is sufficient to significantly improve the processing behavior of these materials. The gauge or thickness of the tie layer is important for the performance of the product. The tie-layer preferably is about 5–25% of the total thickness of the product. More typically, a tie layer representing 10–20%. of total thickness is used (e.g., a 1–1.5 mil layer is used for laminating 3 mil 6–10% LDPE to improve processability and a UV stabilizer, and then extruded through the die at a temperature of 580° F. The laminate was cooled immediately using chill rolls. The physical properties of the finished product were evaluated and a comparison made to a commercial product TX 1200 (Reef Industries, Inc., Houston, Tex. manufactured using adhesive lamination and a 500 denier polyester scrim (Table 3).

TABLE 3

| FILM PROPERTY |  |  | EXAMPLE 1 | TX1200-ADHESIVE TIE-LAYER |
|---|---|---|---|---|
| Thickness (mil) |  |  | 7.6 | 7 |
| Weight (lbs/msf) |  |  | 39.7 | 35 |
| load @ yield (3") | (lbf) | MD | 122 | 61 |
|  | (psi) | MD | 5350 | 2904 |
| load @ yield (3") | (lbf) | TD | 122 | 43 |
| (D-882) | (psi) | TD | 5350 | 2047 |
| Elongation @ break (3") |  | MD | 891 | 782 |
| (D-882) |  | TD | 886 | 788 |
| Grab Tensile strength (lbf/in) |  | MD | 68 | 56 |
| (D-751) |  | TD | 71 | 52 |
| Puncture Prop. & Tear (lbf) |  | MD | 31 | 27 |
| (D-2582) |  | TD | 34 | 29 |
| Tongue Tear (lbf) |  | MD | 25 | 14 |
| (D-2261) |  | TD | 26 | 12 |
| Trapezoidal tear (lbf) |  | MD | 45 | 36 |
| (D-4533) |  | TD | 46 | 24 |

TABLE 3-continued

| FILM PROPERTY | | EXAMPLE 1 | TX1200-ADHESIVE TIE-LAYER |
|---|---|---|---|
| Drop Impact strength (gm) (D-1709) | | 1195 | 1030 |
| Cold Impact strength (° F.) (0.5 lbs, D-1709 mod.) | | −70° | −30° |
| Peel strength (lbf/in) | | 4.8 | 2.5 |
| Seam Strength (lbf) | Shear | 54 | 46 |
| (lbf) | Peel | 35 | 25 |

MD — Machine Direction; TD — Transverse Direction

EXAMPLE 2

This example is a flexible fire-retardant reinforced laminate. Two layers of 3.25 mil fire retardant film were used as the outer skin layers. The flexible fire-retardant film formulation used was 40–50% of linear low density polyethylene, 25–35%. fire retardant masterbatch (organic bromine fire-retardant), and 20–30% flexible plastomer resin (Exact 4044). In addition to imparting flexibility, the plastomer resin greatly improves the fire-retardancy due to its high melt index. The grid used this laminate was a 2.67×2.67 cross-laid (non-woven) 1000 denier, high tenacity polyester grid. The grid was made fire-retardant by using a fire-retardant additive in the poly-vinyl alcohol binder, a phosphorous-based additive gave the best results. The elastomeric tie layer used to laminate the two sheets and also to imbed the reinforcing grid was the same as used in Example 1 (i.e., 16.5 melt index, 0.895 density Exact 4044 plastomer from Exxon Corporation). The tie-layer was blended with about 6–10% LDPE to improve processibility, and then extruded between the two sheets as shown in FIG. 1. The properties of the laminate are given in Table 4.

TABLE 4

| FILM PROPERTY | | | EXAMPLE 2 |
|---|---|---|---|
| Thickness (mil) | | | 8.4 |
| Weight (lbs/msf) | | | 51.2 |
| load @ yield (3") | (lbf) | MD | 172 |
| | (psi) | MD | 6825 |
| load @ yield (3") | (lbf) | TD | 160 |
| (D-882) | (psi) | TD | 6349 |
| Elongation @ break (3") | | MD | 872 |
| (D-882) | | TD | 604 |
| Grab Tensile strength (lbf/in) | | MD | 82.9 |
| (D-751) | | TD | 85.8 |
| Puncture Prop. & Tear (lbf) | | MD | 31.4 |
| (D-2582) | | TD | 33.1 |
| Tongue Tear (lbf) | | MD | 27 |
| (D-2261) | | TD | 25.4 |
| Trapezoidal Tear (lbf) | | MD | 54 |
| (D-4533) | | TD | 51 |
| Hydraulic Burst Strength (psi) (D-3786) | | | 114 |
| Cold Impact strength (° F.) (0.5 lbs, D-1709 mod.) | | | −50° |
| Flame Retardance (CPAI 84) | | | Pass - per sec. 3 Vertical |

The above description, drawings, and examples are illustrative of this invention and not in limitation thereof. As will be evident to those skilled in the art, various modifications can be made in the light of the foregoing disclosure and discussion without departure from the spirit or the scope of the claims.

What is claimed is:

1. A method of making a reinforced laminate, comprising the steps of:

placing a reinforcing grid on a first outer sheet of thermoplastic;

preparing an elastomeric material capable of forming a tie layer between two sheets of thermoplastic; and laminating a second outer sheet of thermoplastic to the first sheet of thermoplastic and the reinforcing grid with the tie layer of elastomeric material therebetween, whereby the reinforcing grid is held by the elastomeric tie layer in between the first outer sheet of thermoplastic and the second outer sheet of thermoplastic, and the reinforcing grid being displaceable within the elastomeric tie layer.

2. The method of claim 1, wherein the laminating step comprises pressure rolling the first outer sheet and the reinforcing grid to the second outer sheet with the elastomeric tie layer therebetween.

3. The method of claim 1, additionally comprising heating the elastomeric tie layer material so that a heated tie layer contacts the reinforcing grid.

4. The method of claim 1, wherein the elastomeric tie layer is extruded between the first outer sheet, the reinforcing grid, and the second outer sheet.

* * * * *